US011021246B2

(12) United States Patent
Koivuranta

(10) Patent No.: US 11,021,246 B2
(45) Date of Patent: Jun. 1, 2021

(54) METHOD AND SYSTEM FOR CAPTURING IMAGES OF ASSET USING UNMANNED AERIAL VEHICLES

(71) Applicant: Sharper Shape Oy, Espoo (FI)

(72) Inventor: Ville Koivuranta, Helsinki (FI)

(73) Assignee: Sharper Shape Oy, Espoo (FI)

( * ) Notice: Subject to any disclaimer, the term of this patent is extended or adjusted under 35 U.S.C. 154(b) by 614 days.

(21) Appl. No.: 15/916,899

(22) Filed: Mar. 9, 2018

(65) Prior Publication Data

US 2019/0276146 A1 Sep. 12, 2019

(51) Int. Cl.
*B64C 39/02* (2006.01)
(52) U.S. Cl.
CPC ...... *B64C 39/024* (2013.01); *B64C 2201/123* (2013.01); *B64C 2201/141* (2013.01)
(58) Field of Classification Search
None
See application file for complete search history.

(56) References Cited

U.S. PATENT DOCUMENTS

| 2017/0166325 | A1* | 6/2017 | Gao | H04N 9/3185 |
| 2017/0206648 | A1* | 7/2017 | Marra | G05D 1/0038 |
| 2018/0002010 | A1* | 1/2018 | Bauer | B64C 39/024 |
| 2019/0160377 | A1* | 5/2019 | Masuda | G06T 19/00 |

* cited by examiner

*Primary Examiner* — Todd Melton
*Assistant Examiner* — Jason R Roberson
(74) *Attorney, Agent, or Firm* — Ziegler IP Law Group, LLC

(57) ABSTRACT

A method and system for capturing images of an asset using an unmanned aerial vehicle. The method includes acquiring structural information of the asset, acquiring surrounding information associated with the asset, analyzing the structural information and the surrounding information of the asset to define image capturing points for the unmanned aerial vehicle, and capturing the images of portions of the asset from the defined image capturing points. Moreover, each of the defined image capturing points allows the unmanned aerial vehicle to capture an image of a portion of the asset with an even background.

17 Claims, 3 Drawing Sheets

METHOD AND SYSTEM FOR CAPTURING IMAGES OF ASSET USING UNMANNED AERIAL VEHICLES

TECHNICAL FIELD

The present disclosure relates generally to unmanned aerial vehicles; and more specifically, to method and system for capturing images of assets using unmanned aerial vehicles.

BACKGROUND

In recent times, unmanned aerial vehicles (UAVs) such as drones, are increasingly being used for a variety of real world applications. For example, the unmanned aerial vehicles may be used for applications such as surveillance, aerial inspection, aerial photography, disaster relief operations and so forth. Furthermore, nowadays commercial use of the unmanned aerial vehicles for aerial inspection of geographical regions and asset inspection is prevalent. Typically, asset inspection relates to inspection of valuable assets such as buildings, bridges, electricity pylons, and so forth.

Generally, the unmanned aerial vehicles used for asset inspection are provided with a flight plan before commencement of flight to capture an image of the asset. However, such flight plan may not include specific information about surroundings, and information about other objects that may be in proximity of the asset. In such instance, the unmanned aerial vehicle may be required to detect such objects in real-time and adjust the flight alignment, positions, orientation accordingly. Furthermore, in an instance of failure (or error) in capturing the image of the asset may lead to problems such as longer distance of travel, additional time of travel, unnecessary power consumption and so forth. Moreover, the unmanned aerial vehicle will capture the image from unplanned locations and may deviate from the desired image capturing positions. As a result, the image of the asset would not have a desired image quality. Furthermore, problems may arise while distinguishing objects proximate to the asset and the asset, and further processing of the image may not be properly executed thereafter.

Recently, various solutions have been implemented to overcome the aforementioned drawbacks such as manual monitoring of unmanned aerial vehicles and controlling them in real time. However, manual monitoring has limitations such as skill error, high cost and so forth. In addition, certain applications have been implemented on the unmanned aerial vehicle to locate the capturing positions to gain images with clear background. However, these applications are not operable to detect the real time challenges and thus fail to generate desired result.

Therefore, in light of the foregoing discussion, there exists a need to overcome the aforementioned drawbacks associated with capturing images of assets using unmanned aerial vehicles.

SUMMARY

The present disclosure seeks to provide a method for capturing images of an asset using an unmanned aerial vehicle. The present disclosure also seeks to provide a system for capturing images of an asset using an unmanned aerial vehicle. The present disclosure seeks to provide a solution to the existing problem of flawed management of unmanned aerial vehicles and substandard quality of image captured by the unmanned aerial vehicles. An aim of the present disclosure is to provide a solution that overcomes at least partially the problems encountered in prior art, and provides a straightforward, easy-to-implement and reliable method of capturing images using an unmanned aerial vehicle.

In one aspect, an embodiment of the present disclosure provides a method for capturing images of an asset using an unmanned aerial vehicle, the method comprising:
  acquiring structural information of the asset;
  acquiring surrounding information associated with the asset;
  analyzing the structural information and the surrounding information of the asset to define image capturing points for the unmanned aerial vehicle; and
  capturing the images of portions of the asset from the defined image capturing points, wherein each of the defined image capturing points allows the unmanned aerial vehicle to capture an image of a portion of the asset with an even background.

In another aspect, an embodiment of the present disclosure provides a system for capturing images of an asset using an unmanned aerial vehicle, the system comprising:
  an image capturing module operable to
    acquire structural information of the asset;
    acquire surrounding information associated with the asset;
    analyze the structural information and the surrounding information of the asset to define image capturing points for the unmanned aerial vehicle; and
    capture the images of portions of the asset from the defined image capturing points, wherein each of the defined image capturing points allows the unmanned aerial vehicle to capture an image of a portion of the asset with an even background; and
  a memory unit coupled to the image capturing module.

Embodiments of the present disclosure substantially eliminate or at least partially address the aforementioned problems in the prior art, and enables superior management of unmanned aerial vehicles.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
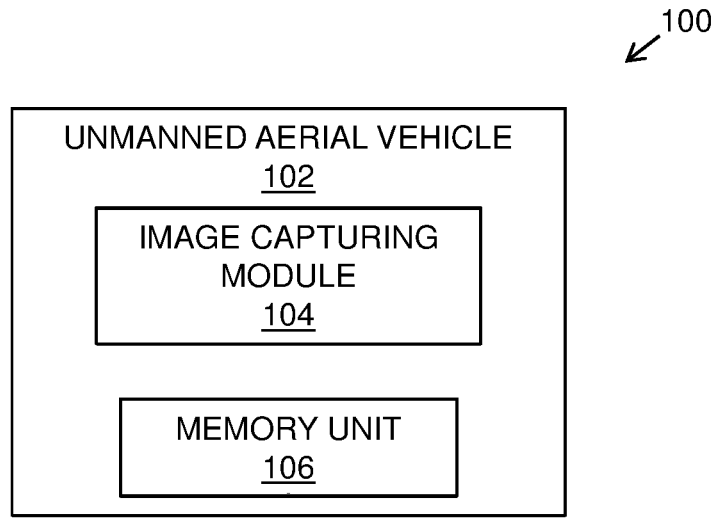
FIG. 1 is a block diagram of a system for capturing images of an asset using an unmanned aerial vehicle, in accordance with an implementation of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for capturing images of an asset using an unmanned aerial vehicle, the method comprising:
  acquiring structural information of the asset;
  acquiring surrounding information associated with the asset;
  analyzing the structural information and the surrounding information of the asset to define image capturing points for the unmanned aerial vehicle; and
  capturing the images of portions of the asset from the defined image capturing points, wherein each of the defined image capturing points allows the unmanned aerial vehicle to capture an image of a portion of the asset with an even background.

In another aspect, an embodiment of the present disclosure provides a system for capturing images of an asset using an unmanned aerial vehicle, the system comprising:
  an image capturing module operable to
    acquire structural information of the asset;
    acquire surrounding information associated with the asset;
    analyze the structural information and the surrounding information of the asset to define image capturing points for the unmanned aerial vehicle; and
    capture the images of portions of the asset from the defined image capturing points, wherein each of the defined image capturing points allows the unmanned aerial vehicle to capture an image of a portion of the asset with an even background; and
  a memory unit coupled to the image capturing module.

The present disclosure provides a method of capturing images of an asset using an unmanned aerial vehicles and enables superior management thereof. Furthermore, the images of the asset captured by the unmanned aerial vehicle have a high image quality. Moreover, the images comprise an even background. Consequently, the asset is easily distinguishable from the objects proximate to the asset. Additionally, the system is operable to define the image capturing points based on the real-time changes in the asset and surroundings of the asset. In addition, an optimum flight plan is generated for the unmanned aerial vehicle to ensure safety thereof. Consequently, power consumption and distance of travel are accordingly regulated.

Throughout the present disclosure, the term "unmanned aerial vehicle" relates to an aircraft without human pilots and/or passengers onboard. Furthermore, the unmanned aerial vehicle (or UAV) may be operated fully or partially autonomously for real world applications (or missions), using on-board computers or remotely located human operators. For example, the unmanned aerial vehicle may be used for missions such as aerial photography, aerial surveillance, aerial inspection, and so forth. It will be appreciated that the unmanned aerial vehicle may be operated to perform operations such as inspection of an asset about operating conditions of the asset, damages to the asset or a portion thereof and so forth. Consequently, the unmanned aerial vehicle is operable to capture images of the asset or portions of the asset for inspection and repair purposes.

In an embodiment, the unmanned aerial vehicle comprises at least one sensor coupled to the image capturing module. Furthermore, the at least one sensor is operable to acquire structural and surrounding information of the asset.

According to an embodiment, the at least one sensor is one of: a LIDAR (light detection and ranging) sensor, an image sensor, a proximity sensor, a distance sensor, a motion sensor, an electromagnetic sensor. For an example, the LIDAR (light detection and ranging) is operable to detect a distance between objects in the proximity. Furthermore, the LIDAR (light detection and ranging) generates a two dimensional, three dimensional map or image, based on the distance of objects detected.

In an embodiment, the unmanned aerial vehicle comprises an image capturing module and a memory unit coupled to the image capturing module. The at least one sensor coupled to the image capturing module is operable to acquire structural information of the asset and surrounding information associated with the asset. Furthermore, optionally, the unmanned aerial vehicle comprises a processor coupled to the at least one sensor, wherein the image capturing module is implemented on the processor.

Throughout the present disclosure, the term "asset" relates to a geographical structure such as a building, a manufacturing setup, a distribution setup, and a vegetation field and so forth. Furthermore, the building may include residential structures, roads, filling stations, bridges, offices, commercial establishments (such as shopping malls and theme parks) and so forth. Additionally, the asset may include a manufacturing setup, such as a factory, production plants, construction sites, mines, and so forth. In addition, the asset may include a distribution setup, such as fuel distribution lines, power lines, electricity pylons, water supply systems, drainage systems, and so forth. In yet another example, the asset may include a vegetation field such as an apple garden or a paddy field.

The unmanned aerial vehicle is operable to capture images of portions of the asset. Furthermore, the portion of the asset may a section of the asset that is meant to be inspected. In an example, the portion of the asset may include sections of fuel distribution lines, power lines, electricity pylons, water supply systems, drainage systems, and so forth. In another example, the portion may include wires, cables, junctions, conductors, panes, and so forth. In yet another, the portion may include a member, brackets, joints, blades and so forth. In yet another example, the portion may be static or dynamic such as hanging, swinging and so forth. Furthermore, the unmanned aerial vehicle is operable to capture image of the portion of the asset having a background behind it. Moreover, the background behind the portion of the asset is said to be an even background if it possess a homogeneous nature with a uniform composition of color and contrast corresponding to the portion of the asset. In an example, the even background may be sky, concrete wall and the like, behind the portion of the asset.

The method for capturing images of the asset using the unmanned aerial vehicle comprises acquiring structural information of the asset. Furthermore, the image capturing module is operable to acquire structural information of the asset. In an implementation, the at least sensor coupled to the unmanned aerial vehicle is operable to acquire the structural information of the asset. Moreover, the at least one sensor is operable to acquire the structural information in real-time while maneuvering around the asset. In another implementation, the structural information may be stored in a database and the image capturing module is operable to acquire the structural information of the asset from the database.

Optionally, the structural information of the asset comprises geometrical measurement data of the asset. Specifically, the geometrical measurement data of the asset may comprise information such as type of asset, shape of the asset, a material of structure of the asset (such as steel or concrete), components of the asset (such as information about number of fuel pumps at a filling station), empty spaces of the asset, and so forth. For example, the geometrical measurement data may be based on appearance, location and so forth. Specifically, the geometrical measurement data may include information associated with length, width, height, diameter, angle of inclination (at different points), and so forth of the asset.

In an embodiment, the structural information of the asset is based on structural attributes associated with the specific asset which is meant to be inspected or targeted. The structural attribute such as for an example, for inspection of an electricity pylon may be defined based on an angle of inclination at various heights on the electricity pylon. In another example, for inspection of a building, the structural information may be defined based on the length, width and height of the building, and the structural attributes associated to the building. In an example, for inspection of a water distribution system, the structural information may be defined based on a diameter of one or more pipes associated with the water distribution system.

Optionally, the structural information of the asset comprises color information of the asset. Specifically, the color information includes at least one color of the asset. More specifically, the color information may include information of the plurality of colors in the portions of the asset. Moreover, the color information may further include information such as surface finish and texture of the asset. Examples of the surface finish and texture include, but are not limited to, glossy, matte, rough, and so forth.

According to an embodiment, the structural information of the asset comprises critical attribute data of the asset. The critical attribute data of the asset is based on the portion of the asset on which the inspection to be performed. In an example, the critical attribute data of asset corresponding to the portion of the asset may be associated with critical structural or functional elements (of the asset), which may be the area of interest and accordingly needs to be inspected for the asset inspection. For example, the critical element of a suspension bridge may include suspension cables, on which structure of the bridge may be suspended. In another example, the critical element of an electricity pylon may include insulators or an aircraft warning light mounted on the pylon.

Optionally, the structural information of the asset corresponding to the portion of the asset may enable the inspection of critical elements of the asset. More optionally, the inspection may comprise collecting at least one of a photo, a video and sensor data based on the critical attribute data of the asset. For example, the unmanned aerial vehicle may be operable to capture photos of insulators of an electricity pylon to enable inspection of the electricity pylon. In another example, the unmanned aerial vehicle may be operable to collect sensor data, such as corona detector data, of power lines to enable in detection of corona discharge from the power lines. It may be evident that inspection performed at specific points (i.e. based on the critical attribute data) may result in better performed operations and may collect desired image accordingly.

The method for capturing image of an asset using an unmanned aerial vehicle comprises acquiring surrounding information associated with the asset. Furthermore, the image capturing module is operable to acquire surrounding information associated with the asset. In an implementation, the at least sensor coupled to the unmanned aerial vehicle is operable to acquire the structural information of the asset. Moreover, the at least one sensor is operable to acquire the structural information in real-time while maneuvering around the asset. In another implementation, the structural information may be stored in a database and the image capturing module is operable to acquire the structural information of the asset from the database.

In an embodiment, the surrounding information of the asset may comprise a geographical information of at least one region around the asset. The geographical information may be acquired to determine the real-world locations of the assets to be inspected. It may be evident that the geographical information may comprise information of the locations of the assets and the geographical information of the regions around the assets. For example, a geographical data may comprise locations of electricity pylons in a city and the geographical information of the regions around the assets may comprise information of landscape, structures, vegetation and so forth located around the electricity pylons. Furthermore, the surrounding information may comprise elevation of surface of earth along with elevation of natural or man-made objects, such as mountains, buildings, and so forth. For example, a geographical data of a region comprising a bridge may include height and length of the bridge and elevation of mountains, trees and roads present in the region around the bridge.

According to an embodiment, the surrounding information of the asset comprises information associated with a background of the portion of the asset to be captured in the image. It will be appreciated that the geographical regions behind the portion of the asset may assist or hinder the inspection of the portion of the asset. It may be evident that surroundings coming in the background of the portion of the asset in the captured image may comprise a different color, shape, size and so forth in comparison with the portion of the asset captured. In order to gain a desired image of the portion of the asset, the image should comprise an even background. Furthermore, the captured image of the portion of the asset with an even background may be help in distinguishing the portion of the asset from the background in the captured image.

In an embodiment, information of the background comprises at least of: a color of a background, an object in the background. Furthermore, the even background may comprise a uniform color and a distinguishable object coming in the background of the portion of the asset. Moreover, the color of the background may comprise a uniform color such as for an example an insulator of a pylon coming in the foreground and a white concrete wall coming in the background of the pylon. In another example, a joint of a bridge coming in the foreground and blue sky coming in the background of the bridge. In yet another example, an apple in a tree coming in the foreground and greenery of mountains coming in the background. Furthermore, the object in the background may comprise uniform object that may be distinguished from the portion of the asset to be captured while inspection of the same asset. Moreover, the objects may be the concrete wall, the sky, mountains and so forth as mentioned previously. Moreover, it is determined that if the object in the background affects a quality of the captured images of the portions of the asset. In an example, an object, such as the sun in the sky, will diminish the quality of the captured image and may cause flares therein.

The method for capturing images of the asset using the unmanned aerial vehicle comprises analyzing the structural information and the surrounding information of the asset to define image capturing points for the unmanned aerial vehicle. Furthermore, the image capturing module is operable to analyze the structural information and the surrounding information of the asset to define image capturing points for the unmanned aerial vehicle. Specifically, the acquired information about the geographical coordinates, color, object in the background of the portion of the asset is analyzed. Additionally, analyzing the structural information and the surrounding information of the asset to define image capturing points for the unmanned aerial vehicle is based on the geographical information and background information associated with the portion of the asset to be captured. Furthermore, each of the defined image capturing points allows the unmanned aerial vehicle to capture an image of a portion of the asset with an even background.

Optionally, analyzing the structural information and the surrounding information comprises processing the acquired structural information and the surrounding information to determine an evenness factor for the background with respect to the portion of the asset to be captured in the image. Specifically, an evenness factor for the background includes a color tolerance of the background and a color difference between the portion of the asset and the background. The color tolerance of the background relates to number of colors in the background and shades (or, hues) thereof. Moreover, the color tolerance of the background is quantified by determining a mean color of the background. Subsequently, each of the color in the background may be compared with determined mean color of the background to determine a value of $\Delta E$ with respect to color tolerance in accordance with CIE 76 and CIE94 formulae. Furthermore, a low value of color tolerance of the background signifies a high uniformity of color in the background. Furthermore, the color difference between the portion of the asset and the background relates to identifying a background with a high color contrast with the portion of the asset.

Specifically, such color contrast between the background and the portion of the asset may assist in distinguishing the portion of the asset in an image captured using the unmanned aerial vehicle. Furthermore, a mean color of the portion of the asset is compared with the mean color of the background to determine a value of $\Delta E$ with respect to color difference in accordance with CIE 76 and CIE94 formulae. Furthermore, a high value of color difference between the portion of the asset and the background signifies a color difference therebetween and is desirable. Beneficially, the portion of the asset is easily distinguishable in an image captured from an image capturing point with an even background and a high color difference between the portion of the asset and the background. In an example, for capturing a corroded portion of a joint on an electrical pylon, a background comprising a tree may not be selected due to the low color difference between the corroded portion and bark (or, leaves) of the tree.

Optionally, analyzing the structural information and the surrounding information further comprises using the determined evenness factor to define an image capturing point. Specifically, the defined image capturing point comprises an evenness factor higher than a predetermined threshold. More specifically, the value of the evenness factor is determined using the color tolerance of the background and the color difference between the portion of the asset and the background.

Optionally, the evenness factor of the background for the defined image capturing point comprises a color tolerance a color tolerance of the background of <$\Delta E$ 15, and a color difference between the portion of the asset and the background, wherein the color difference is >$\Delta E$ 25. Specifically the value of the $\Delta E$ with respect to the color tolerance and the color difference are defined based on the metrics of CIE76 and CIE94. Furthermore, a background with a color tolerance of <(less than) $\Delta E$ 15 indicates a highly uniform background. Additionally a color difference of >(greater than) $\Delta E$ 25 indicates a high color difference between the portion of the asset and the background and consequently, an easy distinguishability of the portion of the asset.

In an embodiment, the unmanned aerial vehicle is operable to capture the images of portions of the asset from the defined image capturing points. It will be appreciated that the image capturing points are based on the structural information and surrounding information associated with the asset to be captured. Furthermore, the image capturing points may comprise an altitude, a latitude and a longitude associated with the portion of the asset to be captured. It will be appreciated that the altitude, latitude and longitude are geographical coordinates lying in a three dimensional space, based on the geographical information associated with the portion of the asset. For an example, for capturing an insulator of a pylon, the image capturing point may be at 33° E, 76° W and 2848 m above sea level. In another example, for capturing a joint of a bridge the image capturing point may be at 26° N, 57° S and 1200 m above sea level. In yet another example, for capturing an apple in a tree, the image capturing point may be at 47° N, 84° E and 678 m above sea level. It will be appreciated that images of portions of the asset are captured for inspection of the asset as an entire entity.

Optionally, the image capturing points for the unmanned aerial vehicle are defined to ensure a safe flight of the unmanned aerial vehicle. Furthermore, the safe flight for the unmanned aerial vehicle is based on the geographical information of the region around the asset. The geographical information of the region around the asset comprises information of objects in close proximity of the asset. Additionally, the safe flight may include considerations such as a safe flying distance. The safe flying distance may be a minimum distance of separation between the unmanned aerial vehicle and objects along the flight route of the unmanned aerial vehicle. In an example, the safe flying distance may be determined using structural information (such as height, length, width and so forth) of the asset. In another example, the safe flying distance may be a default pre-determined distance. It may be evident that the unmanned aerial vehicle may be required to maintain the safe flying distance for avoiding collision with nearby objects. The geographical information may be used to alter the flight of the unmanned aerial vehicle around the asset. Furthermore, the image capturing is also based on the surrounding information of the asset to be captured.

In one embodiment, each of the defined image capturing points comprises a view-point and a view-direction for the unmanned aerial vehicle with respect to the portion of the asset to be captured in the image. Specifically, the view-point defines a geometrical coordinate from which the unmanned aerial vehicle captures the image of the portion of the asset. More specifically, the view-point of an image capturing point relates to geographical coordinates in the three-dimensional space. Moreover, the unmanned aerial vehicle is positioned at the geographical coordinates for capturing the image. Furthermore, the view-direction defines a direction along which the unmanned aerial vehicle captures the image of the portion of the asset. Specifically, the view direction relates to the direction that the at least one sensor (such as, an imaging device) is pointed towards to capture the image of the portion of the asset. It will be appreciated that the direction along which the unmanned aerial vehicle captures the image of the portion of the asset is associated with capturing the image of the portion of the asset with an even background.

Optionally, the method further comprises analyzing the captured image of the portion to determine a predetermined threshold quality associated with the captured image. The predetermined threshold quality of the captured image is analyzed on the basis of a color saturation, a color contrast, a clarity and so forth of a standard image to be qualified. Furthermore, the captured image is qualified on meeting the predetermined threshold quality.

More optionally, the predetermined threshold quality associated with the captured image is based on a predetermined image segmentation parameter. Furthermore, the captured image of the portion of the asset undergoes image segmentation to obtain a distinguished image of the portion of the asset from the background of the asset. Moreover, the image segmentation parameter may be correlated with the color difference between the portion of the asset and the background. In order to qualify predetermined threshold quality, each of the captured image has to qualify a predetermined image segmentation parameter.

In an embodiment, the memory unit is configured to store information associated with at least one of: the structural information, the surrounding information, the image capturing points, the images of the asset. In an implementation, the image capturing module may communicate the acquired structural and surrounding information to the memory unit. In another implementation, the structural and surrounding information related to the asset may be stored in memory unit and communicated to the image capturing module for analysis thereof.

In an embodiment, the unmanned aerial vehicle is operable to recapture an image of the portion when a quality for the captured image of the portion is below the predetermined threshold quality. In addition when the captured image of the portion does not meet the predetermined threshold quality, the unmanned aerial vehicle is operable to recapture the image of the portion to qualify predetermined threshold quality.

In another embodiment, the unmanned aerial vehicle is operable to follow a flight path to capture an image of another portion of the asset when a quality for the captured image of the portion meets the predetermined threshold quality. Furthermore, the unmanned aerial vehicle travels by following the flight path based. Moreover, when the captured image qualifies the predetermined threshold quality, the unmanned aerial vehicle is operable to follow a flight path to capture an image of another portion of the asset or a portion of another asset.

Optionally, the method further comprises generating a flight plan for the unmanned aerial vehicle based on the image capturing points. It will be appreciated that the unmanned aerial vehicle follows the flight path to travel and capture the images of the asset. Specifically, the flight plan is generated to provide the flight path to travel along the image capturing points. In an example, the unmanned aerial vehicle operates on a flight plan generated based on the image capturing points, the structural and surrounding information provided before the flight. In yet another example, the unmanned aerial vehicle operates on acquiring structural information and surrounding information of the asset simultaneously. Furthermore, in such a case the unmanned aerial vehicle is operable to adjust the flight path in the duration of the flight plan.

Optionally, the system further comprises a ground control station communicably coupled to the unmanned aerial vehicle, wherein the ground control station comprises the image capturing module and the memory unit. It will be appreciated that the ground control station communicably coupled to the unmanned aerial vehicle is operable to generate and adjust the flight plan according to the defined image capturing points. Furthermore, the ground control station provides information to the unmanned aerial vehicle related to adjustment of flight plan.

DETAILED DESCRIPTION OF THE DRAWINGS

Referring to FIG. 1, there is shown a block diagram of a system 100 for capturing images of an asset using an unmanned aerial vehicle 102, in accordance with an implementation of the present disclosure. As shown, the unmanned aerial vehicle 102 comprises an image capturing module 104 and a memory unit 106 coupled to the image capturing module 104. Furthermore, the image capturing module 104 is operable to acquire structural information of the asset, acquire surrounding information associated with the asset, analyze the structural information and the surrounding information of the asset to define image capturing points for the unmanned aerial vehicle 102, and capture the images of portions of the asset from the defined image capturing points, wherein each of the defined image capturing points allows the unmanned aerial vehicle 102 to capture an image of a portion of the asset with an even background.

Figure 2:
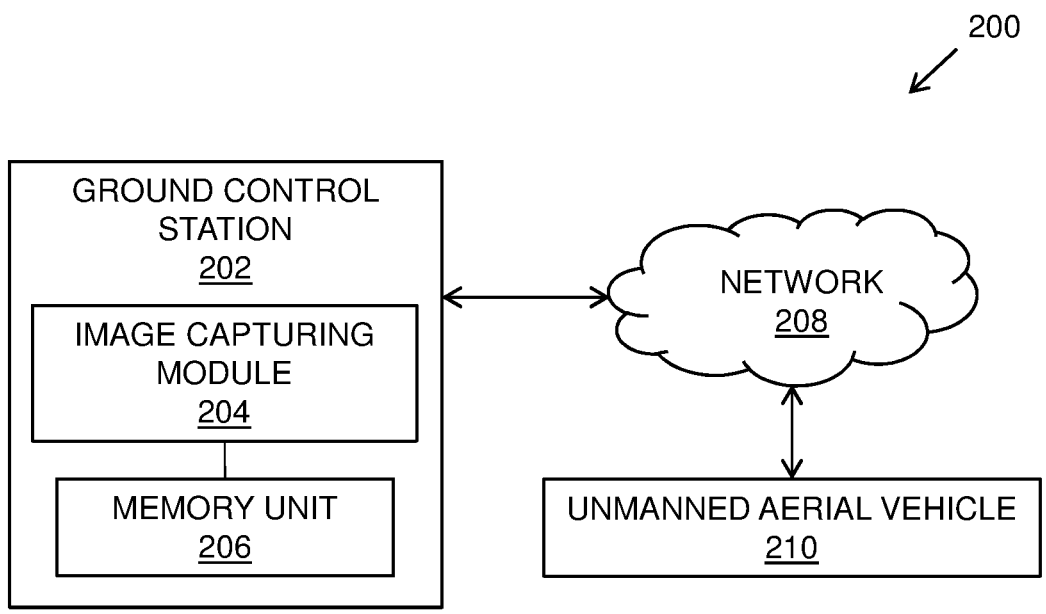
FIG. 2 is a block diagram of a system for capturing images of an asset using an unmanned aerial vehicle, in accordance with another implementation of the present disclosure.

Referring to FIG. 2, there is shown a block diagram of a system 200 for capturing images of an asset using an unmanned aerial vehicle 210, in accordance with another implementation of the present disclosure. As shown, the system 200 comprises a ground control station 202 communicably coupled to the unmanned aerial vehicle 210 via a network 208. The ground control station 202 comprises an image capturing module 204 and a memory unit 206.

Figure 3:
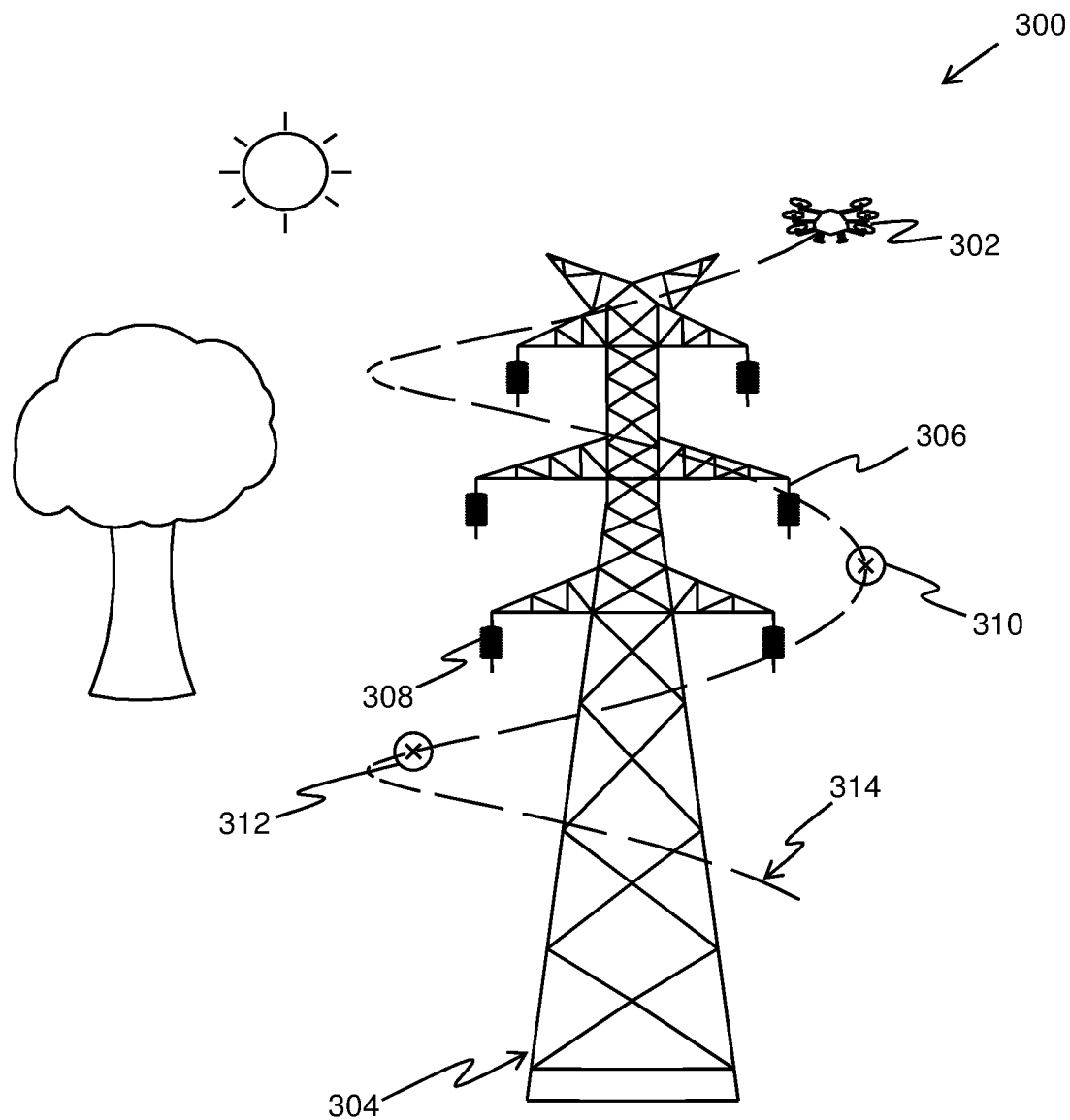
FIG. 3 is an environment depicting an unmanned aerial vehicle capturing images of an asset, in accordance with an exemplary embodiment of the present disclosure.

Referring to FIG. 3, there is shown an environment 300 depicting an unmanned aerial vehicle 302 capturing images of an asset 304 (such as the electrical pylon), in accordance with an exemplary embodiment of the present disclosure. As shown, the unmanned aerial vehicle 302 is operable to capture an image of an asset 304. Specifically, the unmanned aerial vehicle 302 is operable to capture images of portions 306 and 308 of the asset 304. Furthermore, the image capturing points 310 and 312 are defined, based on the structural information of the asset 304 and surrounding information associated with the asset 304, to capture images of the portions 306 and 308, respectively. Furthermore, each of the defined image capturing points 310 and 312 allows the unmanned aerial vehicle to capture an image of a portion of the asset 304 with an even background. Specifically, the image capturing points 310 and 312 (specifically, view point and view direction thereof) may be defined to not include the objects in the background (such as tree and the sun) in the captured image. Furthermore, the unmanned aerial vehicle 302 is operable to follow a flight plan 314 generated based on the image capturing points.

Figure 4:
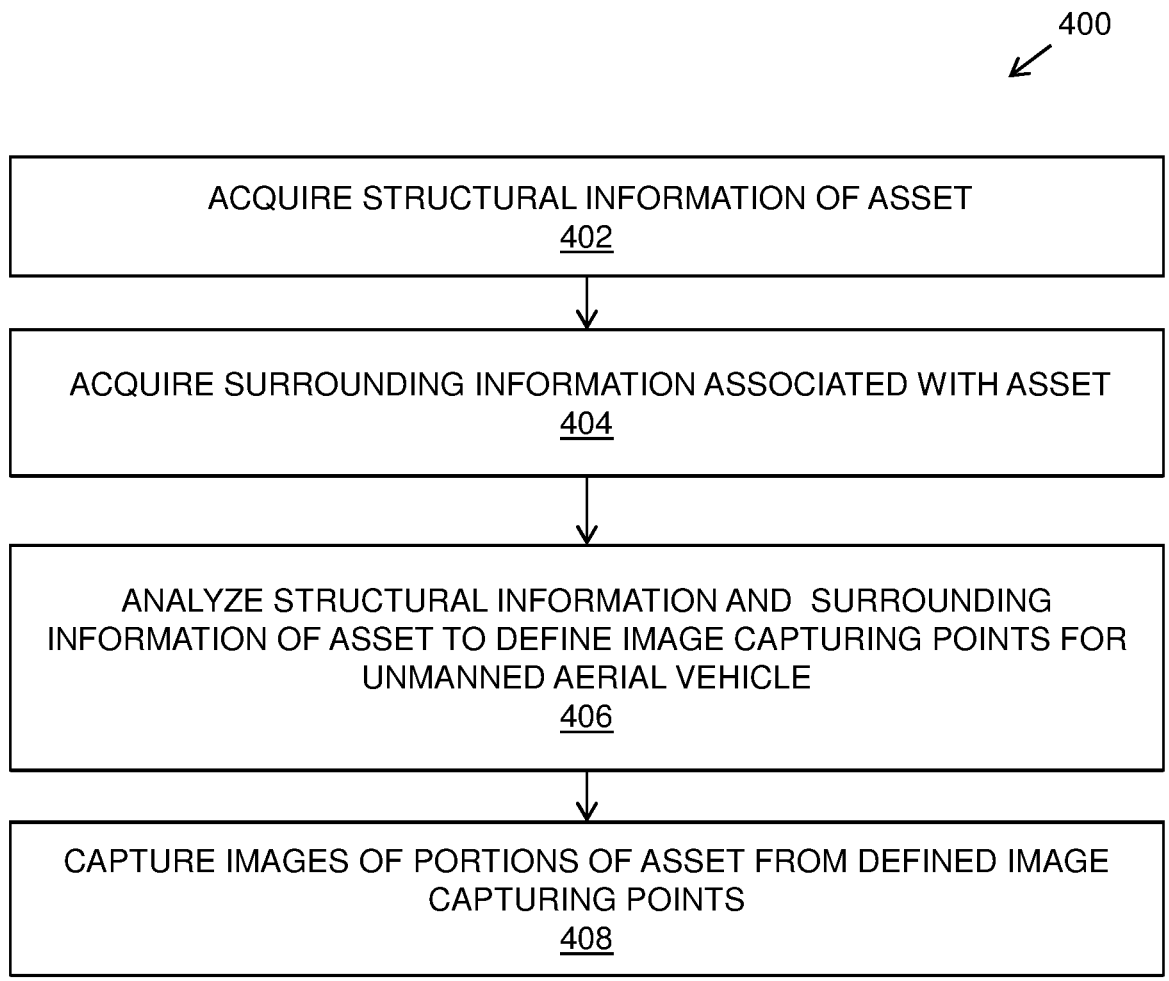
FIG. 4 is an illustration of steps of a method for capturing images of an asset using an unmanned aerial vehicle, in accordance with an embodiment of the present disclosure.

Referring to FIG. 4, there is shown an illustration of steps of a method 400 for capturing images of an asset using an unmanned aerial vehicle, in accordance with an embodiment of the present disclosure. At step 402, structural information of the asset is acquired. At step 404, surrounding information of the at least one asset is acquired. At step 406, structural information and the surrounding information of the asset are analyzed to define image capturing points for the unmanned aerial vehicle. At step 408, images of portions of the asset are captured from the defined image capturing points. Moreover, each of the defined image capturing points allows the unmanned aerial vehicle to capture an image of a portion of the asset with an even background.

The steps 402 to 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for capturing images of an asset using an unmanned aerial vehicle, the method comprising:
   acquiring structural information of the asset;
   acquiring surrounding information associated with the asset;
   analyzing the structural information and the surrounding information of the asset to determine an evenness factor for a background with respect to a portion of the asset to be captured in an image, wherein the evenness factor comprises:
      a color tolerance of the background of <ΔE 15, and
      a color difference between the portion of the asset and the background, wherein the color difference is >ΔE 25;
   using the evenness factor to define image capturing points; and
   capturing images of portions of the asset from the defined image capturing points.

2. The method according to claim 1, wherein the structural information of the asset comprises:
   geometrical measurement data of the asset,
   color information of the asset, and
   critical attribute data of the asset.

3. The method according to claim 1, wherein the surrounding information of the asset comprises information associated with the background of the portion of the asset to be captured in the image.

4. The method according to claim 3, wherein the information of the background comprises at least one of: a color of the background, an object in the background.

5. The method according to claim 1, wherein the defined image capturing points comprises a view-point and a view-direction for the unmanned aerial vehicle with respect to the portion of the asset to be captured in the image.

6. The method according to claim 5, wherein the view-point defines a geometrical coordinate from which the unmanned aerial vehicle captures the image of the portion of the asset.

7. The method according to claim 5, wherein the view-direction defines a direction along which the unmanned aerial vehicle captures the image of the portion of the asset.

8. The method according to claim 1, further comprising analyzing the captured image of the portion of the asset to determine a predetermined threshold quality associated with the captured image.

9. The method according to claim 8, wherein the predetermined threshold quality associated with the captured image is based on a predetermined image segmentation parameter.

10. The method according to claim 8, wherein the unmanned aerial vehicle is configured to:
   recapture an image of the portion of the asset when a quality for the captured image is below the predetermined threshold quality, or
   follow a flight path to capture an image of another portion of the asset when a quality for the captured image of the portion meets the predetermined threshold quality.

11. The method according to claim 1, the method further comprising generating a flight plan for the unmanned aerial vehicle based on the defined image capturing points.

12. A system for capturing images of an asset using an unmanned aerial vehicle, the system comprising:
   an image capturing module configured to:
   acquire structural information of the asset;
   acquire surrounding information associated with the asset;
   analyzing the structural information and the surrounding information of the asset to determine an evenness factor for a background with respect to a portion of the asset to be captured in an image, wherein the evenness factor comprises:
      a color tolerance of the background of <ΔE 15, and
      a color difference between the portion of the asset and the background, wherein the color difference is >ΔE 25;
   use the evenness factor to define image capturing points; and
   capture images of portions of the asset from the defined image capturing points; and
   a memory unit coupled to the image capturing module.

13. The system according to claim 12, wherein the unmanned aerial vehicle comprises the image capturing module and the memory unit.

14. The system according to claim 13, wherein the memory unit is configured to store information associated with at least one of: the structural information, the surrounding information, the image capturing points, the images of the asset.

15. The system according to claim 12, further comprising a ground control station communicably coupled to the unmanned aerial vehicle, wherein the ground control station comprises the image capturing module and the memory unit.

16. The system according to claim 12, wherein the unmanned aerial vehicle comprises at least one sensor coupled to the image capturing module.

17. The system according to claim 16, wherein the at least one sensor is one of: a LIDAR (light detection and ranging) sensor, an image sensor, a proximity sensor, a distance sensor, a motion sensor, an electromagnetic sensor.

* * * * *